United States Patent Office 2,971,946
Patented Feb. 14, 1961

2,971,946

RUBBERY COPOLYMERS CONTAINING MINOR AMOUNTS OF A MONOMETHACRYLATE ESTER OF AN ALKYLENE GLYCOL

Robert A. Hayes, Cuyahoga Falls, and Floyd M. Smith, Akron, Ohio, assignors to The Firestone Tire & Rubber Company, Akron, Ohio, a corporation of Ohio No Drawing. Filed Aug. 22, 1957, Ser. No. 679,785

15 Claims. (Cl. 260—78.4)

This invention relates to diene elastomers containing hydroxyl groups and cured with a cyclic dianhydride or other cyclic polyanhydride. The invention relates to the cured elastomers and the method of preparing them.

By a diene elastomer is meant an elastomer which is a copolymer containing at least 50 percent of the diene. The diene is usually butadiene, but may be isoprene, etc. The hydroxyl-containing elastomer of this invention is formed by copolymerizing substantially 2 to 20 percent (based on the total monomer weight) of a glycol monoacrylate with the diene. This is either the monoester of ethylene, propylene or butylene glycol with acrylic or methacylic acid. One or more other ethylenically unsaturated monomers may be employed in the copolymerization. Such monomers include styrene, the alkyl acrylates and methacrylates (in which the alkyl group is usually methyl or ethyl), acrylonitrile, and any one or more such monomers commonly used in the preparation of diene elastomers. Thus the elastomer may be composed only of butadiene or isoprene, and the glycol monoalkyl ester; or it may be derived from one or more additional monomers.

The glycol monoester is advantageously formed by the reaction of an alkylene oxide with either acrylic acid or methacrylic acid. The reaction is described in Caldwell 2,484,487. According to a preferred procedure described in application Serial No. 663,900, filed June 6, 1957, now U.S. 2,929,835, 1.05 to 1.50 molecular equivalents of oxide are reacted with 1.0 molecular equivalent of acid, using an alkaline catalyst, and the reaction is stopped when the acid number is 2 to 40. This process yields a more stable crude product than is obtained by the prior art.

The degree of vulcanization is controlled in either of two ways:

(1) By preparing a copolymer containing a pre-determined number of hydroxyl groups. In that event vulcanization of all of the hydroxyl groups will result in the desired vulcanization. There is no danger of over-vulcanization. In that case an excess of the curing agent may be employed.

(2) If the copolymer contains an excess of hydroxyl groups, the amount of the anhydride used for the vulcanization is limited so that only a certain number of hydroxyl groups are affected during the cure.

The preferred curing agent is a cyclic dianhydride such as pyromellitic acid dianhydride, 1,2,3,4-butanetetracarboxylic acid anhydride, etc. It forms diesters with the hydroxyl groups of the copolymer. Polyanhydrides may be used, as, for example, copolymers of maleic anhydride with styrene, isobutylene, vinyl acetate, vinyl ether, etc., in which there are two or more cyclic anhydride units per molecule. They are cyclic anhydrides of polycarboxylic acids containing at least four carboxyl groups occurring in pairs, which are either on adjacent carbon atoms or on alternate carbon atoms. The anhydrides form polyesters with the hydroxyl groups of the copolymer.

The following example illustrates the preparation of the ethylene glycol monoester.

*Preparation of ethylene glycol monomethacrylate*

One hundred twenty-nine grams of alpha-methacrylic acid (1.5 moles), 88 grams of ethylene oxide (2.0 moles), and 5 gram of solid sodium methacrylate (0.046 mole), as catalyst, were sealed in a bottle equipped with a rubber cap and shaken in a water bath at 70° C. After 27 hours, the bottle was removed from the water bath, cooled to room temperature and opened. Vacuum distillation of the crude reaction product yielded a pure product with a boiling point of 69 to 71° C. at 2.5 mm. of mercury pressure, an acid number of substantially zero, a saponification value of 131 and a refractive index, $20_D$, of 1.4531.

The following example is illustrative of the type of elastomer to which the invention applies.

*Preparation of elastomer*

The elastomer was produced by adding the following ingredients to a 28-ounce bottle:

| | Parts by weight |
|---|---|
| Butadiene | 65 |
| Acrylonitrile | 31 |
| Ethylene glycol monomethylmethacrylate | 4 |
| Potassium persulfate | 0.4 |
| Soap flakes | 5 |
| Sulfole B8 [1] | 0.3 |
| Water | 180 |

[1] Mixed tertiary $C_{12}$ mercaptan.

The polymerization was carried out at 50° C. for 4 to 6 hours to 70 percent conversion, while shaking the bottle. A short-stopping agent and an antioxidant were added to the bottle and the polymer was coagulated and washed in the conventional manner.

The amount of butadiene and acrylonitrile in the foregoing formula may be varied within the percentages given above for the overall composition of the elastomer. Methylmethacrylate may be substituted for the acrylonitrile, and other substitutions may be made within the overall percentages given. As is well known in the art, methylmethacrylate copolymerizations require somewhat longer than the acrylonitrile copolymerizations, so times and temperatures will be changed depending upon the monomers entering into the reaction.

Several cures are described in what follows. For brevity PMDA is used for pyromellitic dianhydride, and BTCD is used for 1,2,3,4-butanetetracarboxylic acid dianhydride.

The following table refers to cures obtained with the above terpolymer elastomer and two different cyclic dianhydrides. The formula for the cure with PMDA was:

| | Parts by weight |
|---|---|
| Copolymer | 100 |
| HAF black | 40 |
| PMDA | 3 |

The formula for the other cure was the same except that 1 part of N-methylmorpholine was added as a cure activator. Each stock was cured for 60 minutes at 330° F.

These two stocks were oven-aged for 8 hours, at different temperatures as indicated in the table, and then they were tested to determine their physical properties with the results recorded. In the table 200% modulus (in p.s.i.) is abbreviated M; tensile strength (in p.s.i.) is abbreviated T; and elongation at break (in percentages) is indicated by E. The two stocks are identified by the dianhydride used in curing them.

| Aging Temp., °F. | Test Temp., °F. | Tensile Properties at Elevated Temperatures of Two Cured Butadiene-Acrylonitrile-Ethylene Glycol Monomethacrylate Terpolymer Stocks | | | | | |
|---|---|---|---|---|---|---|---|
| | | BTCD | | | PMDA | | |
| | | M | T | E | M | T | E |
| ----- | 73 | 2,000 | 3,300 | 280 | 1,275 | 3,425 | 380 |
| 200 | 73 | 2,375 | 3,500 | 270 | 1,925 | 3,175 | 290 |
| 250 | 73 | 2,125 | 3,450 | 280 | 2,250 | 2,900 | 240 |
| 300 | 73 | ----- | 2,425 | 190 | ----- | 2,075 | 170 |
| 350 | 73 | ----- | 425 | 60 | ----- | 550 | 60 |
| ¹ 350 | 73 | 2,300 | 2,950 | 230 | 2,075 | 3,300 | 280 |

¹ Aged in oven which was flushed with lamp nitrogen prior to and during the heat aging. This shows the absence of thermal degradation and over-vulcanization at 350° F. in the absence of air.

The thermal aging data shows that the cured products have improved properties, compared to the properties of conventionally cured rubbers.

One hundred parts of a terpolymer elastomer formed from butadiene, methyl methacrylate and ethylene glycol monomethacrylate in the ratio of 75:20:5 were compounded with 40 parts of HAF black and 2 parts N-phenyl-2-naphthylamine as an antioxidant. Separate portions of this stock were mixed with 3 parts of PMDA and BTCD. The stocks were cured for 60 minutes at 320° F. The PMDA stock had a tensile strength of 1850 p.s.i. and elongation of 180 percent. The BTCD stock had a tensile strength of 1350 p.s.i., and an elongation of 240 percent.

From the above data, it is clear that desirable vulcanizate properties are obtained. The rubbers are useful where other rubber products are now used.

The invention is covered in the claims which follow.

What we claim is:

1. The process of curing an elastomeric copolymer of at least substantially 50 percent by weight of a conjugated aliphatic diolefin monomer, and substantially 2 to 20 percent by weight of a glycol monoester of the class consisting of ethylene, propylene and butylene glycol monoesters of acrylic and methacrylic acids, which process comprises heating the copolymer with a substantial amount of a polyanhydride of a polycarboxylic acid containing at least two cyclic anhydride units per molecule each of which units has the structure

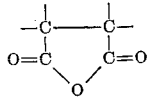

to effect a cure, the amount of the anhydride units present being not in substantial excess of the amount required for the reaction of one anhydride unit with each hydroxyl group of the copolymer.

2. The process of curing an elastomeric copolymer of at least substantially 50 percent by weight of a conjugated aliphatic diolefin monomer, and substantially 2 to 20 percent by weight of a glycol monoester of the class consisting of ethylene, propylene and butylene glycol monoesters of acrylic and methacrylic acids, which process comprises heating the copolymer with a substantial amount of a polyanhydride of a polycarboxylic acid containing at least two cyclic anhydride units per molecule each of which units has the structure

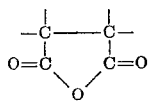

to effect a cure, the amount of the anhydride units present being not in substantial excess of the amount required for the reaction of one anhydride unit with each hydroxyl group of the copolymer.

3. The process of claim 1 in which the polyanhydride is pyromellitic acid dianhydride.

4. The process of claim 1 in which the polyanhydride is 1,2,3,4-butanetetracarboxylic acid dianhydride.

5. The process of curing an elastomeric copolymer of substantially 50 to 98 percent by weight of butadiene, substantially 0 to 48 percent by weight of methyl methacrylate and substantially 2 to 10 percent by weight of an ethylene glycol monoalkylacrylate in which the alkyl group is from the class consisting of methyl and ethyl, which process comprises heating with a substantial amount of pyromellitic acid dianhydride to effect a cure, the amount of anhydride units being not in substantial excess of the amount required for the reaction of one anhydride unit with each hydroxyl group of the copolymer.

6. The process of curing an elastomeric copolymer of substantially 50 to 98 percent by weight of butadiene, substantially 0 to 48 percent by weight of methyl methacrylate and substantially 2 to 10 percent by weight of an ethylene glycol monoalkylacrylate in which the alkyl group is from the class consisting of methyl and ethyl, which process comprises heating with a substantial amount of 1,2,3,4-butanetetracarboxylic acid dianhydride to effect a cure, the amount of anhydride units being not in substantial excess of the amount required for the reaction of one anhydride unit with each hydroxyl group of the copolymer.

7. The process of curing an elastomeric copolymer of substantially 50 to 98 percent by weight of butadiene, a substantial amount not in excess of 48 percent by weight of acrylonitrile and substantially 2 to 10 percent by weight of an ethylene glycol monoalkylacrylate in which the alkyl group is from the class consisting of methyl and ethyl, which process comprises heating with a substantial amount of pyromellitic acid dianhydride to effect a cure, the amount of anhydride units being not in substantial excess of the amount required for the reaction of one anhydride unit with each hydroxyl group of the copolymer.

8. The process of curing an elastomeric copolymer of substantially 50 to 98 percent by weight of butadiene, a substantial amount not in excess of 48 percent by weight of acrylonitrile and substantially 2 to 10 percent by weight of an ethylene glycol monoalkylacrylate in which the alkyl group is from the class consisting of methyl and ethyl, which process comprises heating with a substantial amount of 1,2,3,4-butanetetracarboxylic acid dianhydride to effect a cure, the amount of anhydride units being not in substantial excess of the amount required for the reaction of one anhydride unit with each hydroxyl group of the copolymer.

9. The process of curing an elastomeric copolymer of substantially 50 to 98 percent by weight of butadiene, a substantial amount not in excess of 48 percent by weight of methyl methacrylate and substantially 2 to 10 percent by weight of ethylene glycol monomethacrylate, which process comprises heating with a substantial amount of pyromellitic acid dianhydride to effect a cure, the amount of anhydride units being not in substantial excess of the amount required for the reaction of one anhydride unit with each hydroxyl group of the copolymer.

10. The process of curing an elastomeric copolymer of substantially 50 to 98 percent by weight of butadiene, a substantial amount not in excess of 48 percent by weight of acrylonitrile and substantially 2 to 10 percent by weight of ethylene glycol monomethacrylate, which process comprises heating with a substantial amount of pyromellitic acid dianhydride to effect a cure, the amount of anhydride units being not in substantial excess of the amount required for the reaction of one anhydride unit with each hydroxyl group of the copolymer.

11. A cured elastomer copolymer, which is the polyester of (a) a polycarboxylic acid containing at least four carboxyl groups occurring in vicinal pairs on adjacent carbon atoms, and (b) an elastomeric copolymer composed of at least substantially 50 percent by weight of a conjugated aliphatic diolefin monomer, at least substantially 2 to 20 percent by weight of a glycol monoester from the class consisting of ethylene, propylene and butylene glycol monoesters of acrylic and methacrylic acids and a substantial amount up to 48 percent by weight of an ethylenically unsaturated monomer different from the foregoing, only one carboxyl group of each pair being esterified.

12. A cured elastomer copolymer, which is the polyester of (a) a polycarboxylic acid containing at least four carboxyl groups occurring in vicinal pairs on adjacent carbon atoms, and (b) a copolymer of substantially 50 to 98 percent by weight of butadiene, substantially 0 to 48 percent by weight of methyl methacrylate and substantially 2 to 20 percent by weight of a glycol monoester from the class consisting of ethylene, propylene and butylene glycol monoesters of acrylic and methacrylic acids, only one carboxylic group of each pair being esterified.

13. A cured elastomer copolymer, which is the polyester of (a) a polycarboxylic acid containing at least four carboxyl groups occurring in vicinal pairs on adjacent carbon atoms, and (b) a copolymer of substantially 50 to 98 percent by weight of butadiene, substantially 0 to 48 percent by weight of acrylonitrile and substantially 2 to 20 percent by weight of a glycol monoester from the class consisting of ethylene, propylene and butylene glycol monoesters of acrylic and methacrylic acids, only one carboxyl group of each pair being esterified.

14. The cured elastomer of claim 11 in which the carboxylic acid is 1,2,3,4-butanetetracarboxylic acid.

15. The cured elastomer of claim 11 in which the carboxylic acid is pyromellitic acid.

References Cited in the file of this patent

UNITED STATES PATENTS

| | | |
|---|---|---|
| 1,864,909 | Jaeger | June 28, 1932 |
| 2,524,432 | Dorough | Oct. 3, 1950 |
| 2,585,323 | Elwell et al. | Feb. 12, 1952 |
| 2,681,897 | Frazier et al. | June 22, 1954 |
| 2,768,153 | Shokal | Oct. 23, 1956 |

OTHER REFERENCES

Turner: Paint Manufacture, vol. 26, #5, pp. 157–162 and 176.

Charlton: Modern Plastics, September 1954, pp. 155–157, 160–161, 240–243.

Shell Technical Bulletin SC:57–16, April 1957, p. 4.